United States Patent
Ma

(10) Patent No.: US 7,043,746 B2
(45) Date of Patent: May 9, 2006

(54) SYSTEM AND METHOD FOR RE-ASSURING DELIVERY OF TELEVISION ADVERTISEMENTS NON-INTRUSIVELY IN REAL-TIME BROADCAST AND TIME SHIFT RECORDING

(75) Inventor: Yue Ma, West Windsor, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 466 days.

(21) Appl. No.: 10/337,006

(22) Filed: Jan. 6, 2003

(65) Prior Publication Data

US 2004/0133909 A1    Jul. 8, 2004

(51) Int. Cl.
*H04N 9/00* (2006.01)
*H04N 7/16* (2006.01)

(52) U.S. Cl. .......................... 725/22; 725/23; 725/34; 705/14

(58) Field of Classification Search ............... 725/22, 725/23, 32, 34, 35, 36; 705/14
See application file for complete search history.

(56) References Cited

U.S. PATENT DOCUMENTS

| | | | |
|---|---|---|---|
| 5,333,091 A | 7/1994 | Iggulden et al. | |
| 5,659,653 A | 8/1997 | Diehl et al. | |
| 5,664,948 A | 9/1997 | Dimitriadis et al. | |
| 5,668,917 A | 9/1997 | Lewine | |
| 5,692,093 A | 11/1997 | Iggulden et al. | |
| 5,696,866 A | 12/1997 | Iggulden et al. | |
| 5,826,165 A * | 10/1998 | Echeita et al. | 725/22 |
| 5,911,029 A | 6/1999 | Sakaguchi et al. | |
| 5,953,487 A | 9/1999 | Engle et al. | |
| 5,987,210 A | 11/1999 | Iggulden et al. | |
| 5,999,688 A | 12/1999 | Iggulden et al. | |
| 5,999,689 A | 12/1999 | Iggulden | |
| 6,002,443 A | 12/1999 | Iggulden | |
| 6,002,450 A * | 12/1999 | Darbee et al. | 348/734 |
| 6,002,831 A | 12/1999 | Tada et al. | |
| 6,041,159 A | 3/2000 | Platte | |
| 6,057,872 A * | 5/2000 | Candelore | 725/23 |
| 6,141,010 A | 10/2000 | Hoyle | |
| 6,173,271 B1 | 1/2001 | Goodman et al. | |
| 6,226,444 B1 | 5/2001 | Goldschmidt Iki et al. | |
| 6,229,522 B1 | 5/2001 | Reid | |
| 6,236,801 B1 | 5/2001 | Engle et al. | |

(Continued)

FOREIGN PATENT DOCUMENTS

EP        1076983        2/2001

(Continued)

OTHER PUBLICATIONS

Non-literature prior art located at the internet website address: http://www.claria.com/.

*Primary Examiner*—Vivek Srivastava
(74) *Attorney, Agent, or Firm*—Harness, Dickey & Pierce, PLC

(57) ABSTRACT

An advertising content redelivery system for use with real-time broadcasting and time shift recording includes a confirmation component detecting skipping of advertising content by a user. An input is receptive of user preferences relating to redelivery of skipped advertising content, and a redelivery module redelivers skipped advertising content to the user in accordance with the user preferences. In another aspect, skipped advertising content is redelivered to the user in a non-intrusive manner that does not interfere with user enjoyment of primary media content.

24 Claims, 15 Drawing Sheets

U.S. PATENT DOCUMENTS

| | | |
|---|---|---|
| 6,275,646 B1 | 8/2001 | Tada et al. |
| 6,343,179 B1 | 1/2002 | Suito et al. |
| 6,351,596 B1 | 2/2002 | Ostrover |
| 6,404,977 B1 | 6/2002 | Iggulden |
| 6,425,127 B1* | 7/2002 | Bates et al. .................. 725/32 |
| 2002/0078440 A1* | 6/2002 | Feinberg et al. ............... 725/9 |
| 2002/0144262 A1 | 10/2002 | Plotnick et al. |
| 2002/0178447 A1* | 11/2002 | Plotnick et al. .............. 725/36 |
| 2003/0037330 A1 | 2/2003 | Makofka |
| 2004/0030599 A1* | 2/2004 | Sie et al. ..................... 705/14 |
| 2004/0034874 A1 | 2/2004 | Hord et al. |
| 2004/0083484 A1* | 4/2004 | Annon Ryal ................... 725/1 |
| 2005/0183111 A1* | 8/2005 | Cragun et al. ............... 725/22 |

FOREIGN PATENT DOCUMENTS

| | | |
|---|---|---|
| WO | WO 9955066 | 10/1999 |

\* cited by examiner

SYSTEM AND METHOD FOR RE-ASSURING DELIVERY OF TELEVISION ADVERTISEMENTS NON-INTRUSIVELY IN REAL-TIME BROADCAST AND TIME SHIFT RECORDING

FIELD OF THE INVENTION

The present invention generally relates to advertisement delivery methods and systems, and particularly relates to redelivery of skipped advertising content according to user preferences, thereby avoiding intrusion on user enjoyment of primary media content.

BACKGROUND OF THE INVENTION

Today's television (TV) viewer often has the option of whether to skip an advertisement using an automated feature of a media content viewing/recording device or system. This ability increases viewer enjoyment of primary media content, but results in a decrease in return on investments made by advertisers who subsidize delivery of the primary media content, and an increase in costs passed on to viewers. Also, viewers automatically skipping all advertisements can unwittingly miss an advertisement that they would otherwise wish to receive, especially if receivable in a manner that does not interfere with user enjoyment of the primary media content. Therefore, the need remains for a system and method of advertising content redelivery that redelivers advertising content to a user based on user preferences in a manner that does not interfere with user enjoyment of primary media content. The present invention fulfills this need.

SUMMARY OF THE INVENTION

According to the present invention, an advertising content redelivery system for use with real-time broadcasting and time shift recording includes a confirmation component detecting skipping of advertising content by a user. An input is receptive of user preferences relating to redelivery of skipped advertising content, and a redelivery module redelivers skipped advertising content to the user in accordance with the user preferences. In another aspect, skipped advertising content is redelivered to the user in a non-intrusive manner that does not interfere with user enjoyment of primary media content.

It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
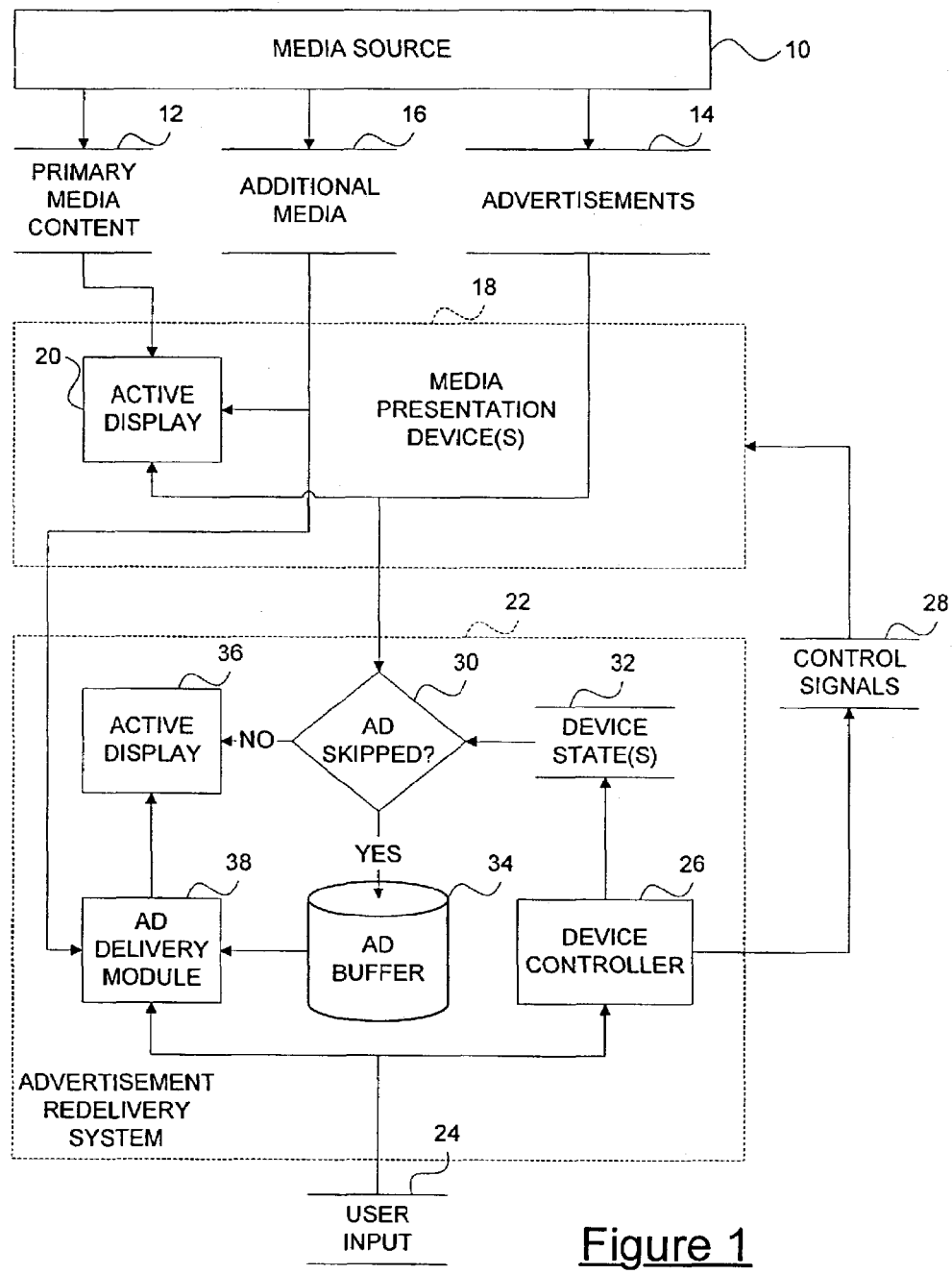
FIG. 1 is a block diagram depicting a generalized advertisement redelivery system according to the present invention.

According to the present invention and as illustrated in FIG. 1, a source of media content 10, such as a set top box (STB), airwave or satellite broadcast, and/or cable feed, provides primary media content 12, such as a television program. It further provides supplemental media content such as advertising content 14 and additional media 16, such as an Electronic Programming Guide (EPG) providing information about available primary media content, and/or closed captions. Media presentation devices 18, such as a television and video recording device receive the primary media content and render primary media content 12 to an active display 20. It should be readily understood that devices 18 are variably operable to render additional media 16 and/or advertising content 14 to active display 20 in accordance with various implementations of the invention.

In the preferred embodiment, the user possesses a handheld device implementing advertisement delivery system 22 and receptive of user input 24 to device controller 26, which delivers control signals 28 to devices 18 according to user input 24, thereby affecting remote control of devices 18. Confirmation component 30 detects skipping of an advertisement based on states 32 of devices 18 and received advertising content 14, and stores skipped advertising content in data store 34. It further displays unskipped advertising content on an active display 36, thereby avoiding interfering with user enjoyment of primary media content 12 via active display 20. Advertisement delivery module 38 is adapted to deliver skipped advertising content from data store 34 to the user in accordance with user preferences expressed via user input 24, and to accomplish delivery of skipped advertising media content in a non-intrusive manner, thereby avoiding interfering with user enjoyment of primary media content 12 via active display 20.

Figure 2:
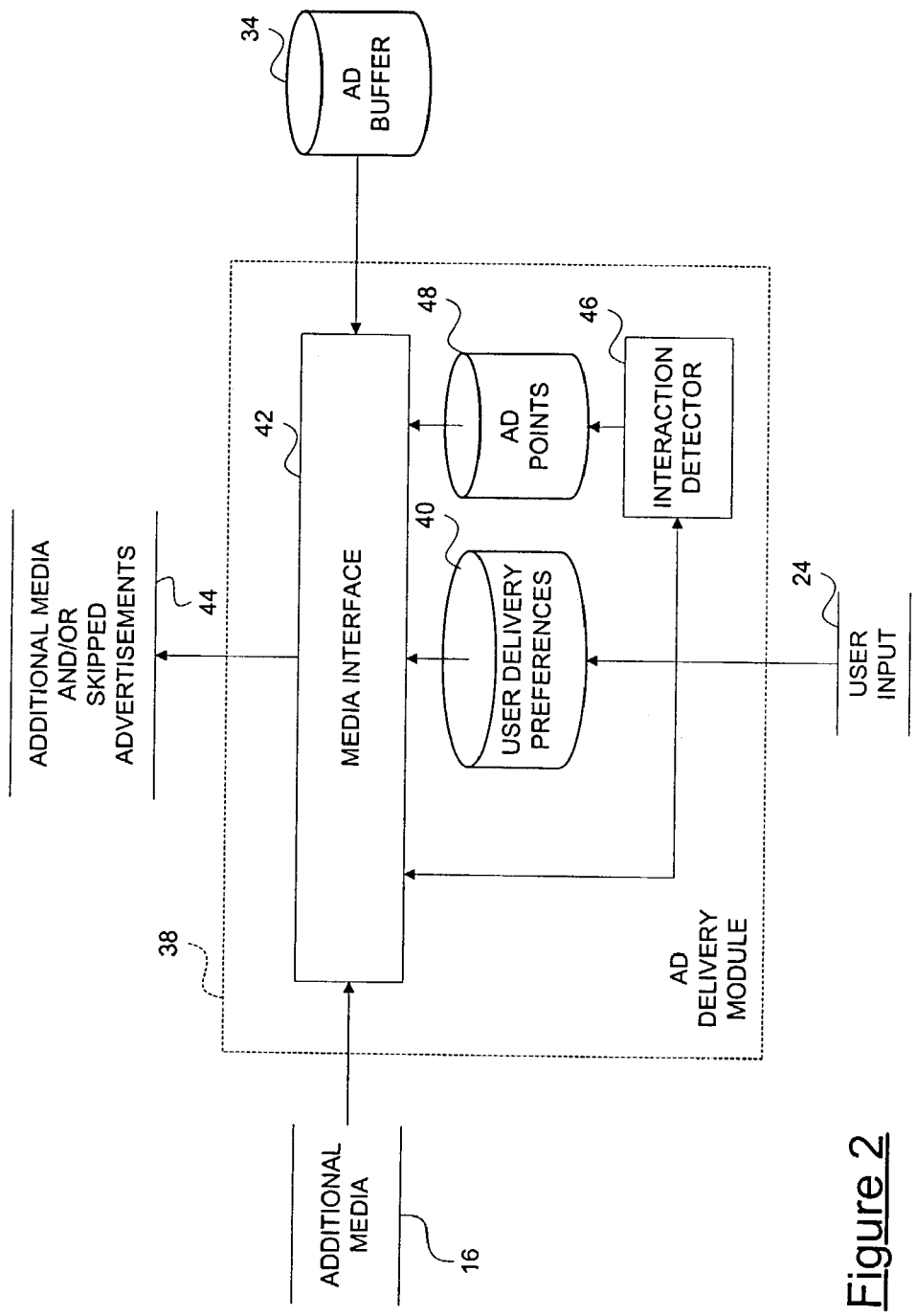
FIG. 2 is a block diagram depicting a generalized advertisement redelivery module according to the present invention.

Turning to FIG. 2, advertisement delivery module 38 receives and/or stores user preferences 40 in the form of delivery options and/or search terms expressed by user input 24. Accordingly, a user can indicate types of advertisements desired on a regular basis, such as movie trailers, and media interface 42 can preferentially retrieve advertisements from data store 34 according to the expressed type, and deliver those advertisements to the active display while the user is accessing additional media 16. Thus, media interface 42 delivers additional media and/or skipped advertisements 44 to the active display in accordance with user preferences; it further avoids interfering with user enjoyment of the primary media content. Module 38 still further has an interaction detector 46 detecting user interactions with the skipped advertising content, and the manner of detection can vary depending on a type of the skipped advertising content. Accordingly, mouse clicks and/or scrolling actions can be detected for an advertisement displayed as and interacted with in the form of a web page. Interactive advertisements can further require more direct user input of specific types according to their interactive functions.

According to the present invention, detection of user interaction with skipped advertising content can be rewarded in various ways. Module 38, for example, has a points accumulator 48 that permits the user to accumulate points based on user interaction with skipped advertising content, and based on the value of the skipped advertising content. Media interface 42 is in turn adapted to apply the accumulated points when retrieving skipped advertising content and/or granting user access to additional media 16. Also, advertisements can be retrieved at will by keyword search, so that the user can retrieve vouchers as needed while shopping. Accordingly, users can take the handheld device when grocery shopping, retrieve electronic coupons based on their shopping needs, and display bar codes to the device display during checkout.

Figure 3:
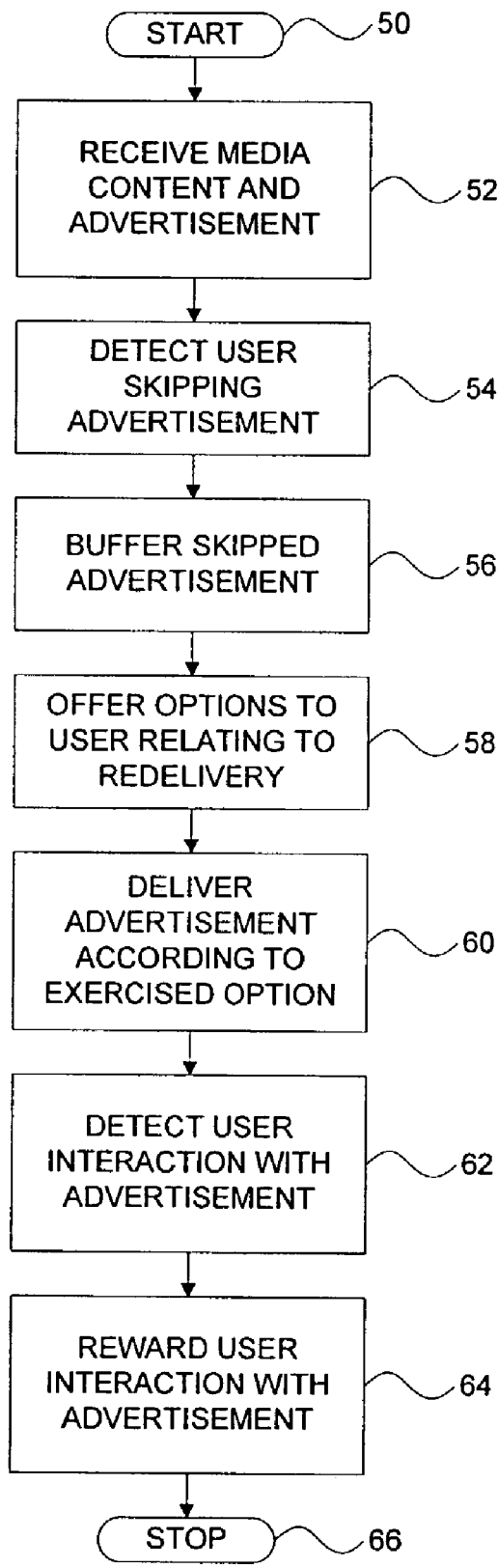
FIG. 3 is a flow chart depicting a generalized advertisement redelivery method according to the present invention.

The advertising content redelivery method according to the present invention is illustrated in FIG. 3. Beginning at 50, media content is received at step 52, including advertising content. For example, a user having a cable feed to an automatic recording device receives programs and advertisements and stores user selected programs in memory, creating an index of stored programs based on the stored contents. The storage technique can, for example, store only the programs while skipping all advertisements. Thus, user skipping of advertisements is appropriately detected at step 54 every time the device receives an advertisement associated with a program it is recording. Alternatively, if the recording device records the advertisements with the program, then skipping is appropriately detected when the user fast forwards through an advertisement during replay. As a further alternative, a remote control device can be constructed to detect channel switching during advertisements.

The recording device and/or remote control device thus buffers the skipped advertisements at step 56 by, for example, storing them and/or information identifying them in a memory located on the remote control device. The method includes offering options to the user relating to redelivery at step 58, such that the user can express an option, for example, to have the advertisements redelivered by voicemail and/or email. Thus, the recording device may additionally or alternatively send the advertisements to the user's email or voicemail at step 60, where the advertisements are delivered according to the exercised options. The remote control additionally and/or alternatively redelivers the skipped advertisements to the user via an active display and in accordance with preferences expressed by the user in step 60.

User interactions with the skipped advertising content are detected at step 62, and the user is rewarded for interacting with the skipped advertising content at step 64. These steps 62 and 64, for example, correspond to detecting user manipulation of the advertisement on an active display, and then granting the user access to programming information relating to available media content in a manner that does not interfere with user enjoyment of the primary media content. The reward may also include credit towards video on demand services (Pay Per Views, etc.), reduced subscription costs, subsidization of viewing/recording equipment, convenient access to advertising content of interest to the user, and/or vouchers for products and services.

Figure 4:
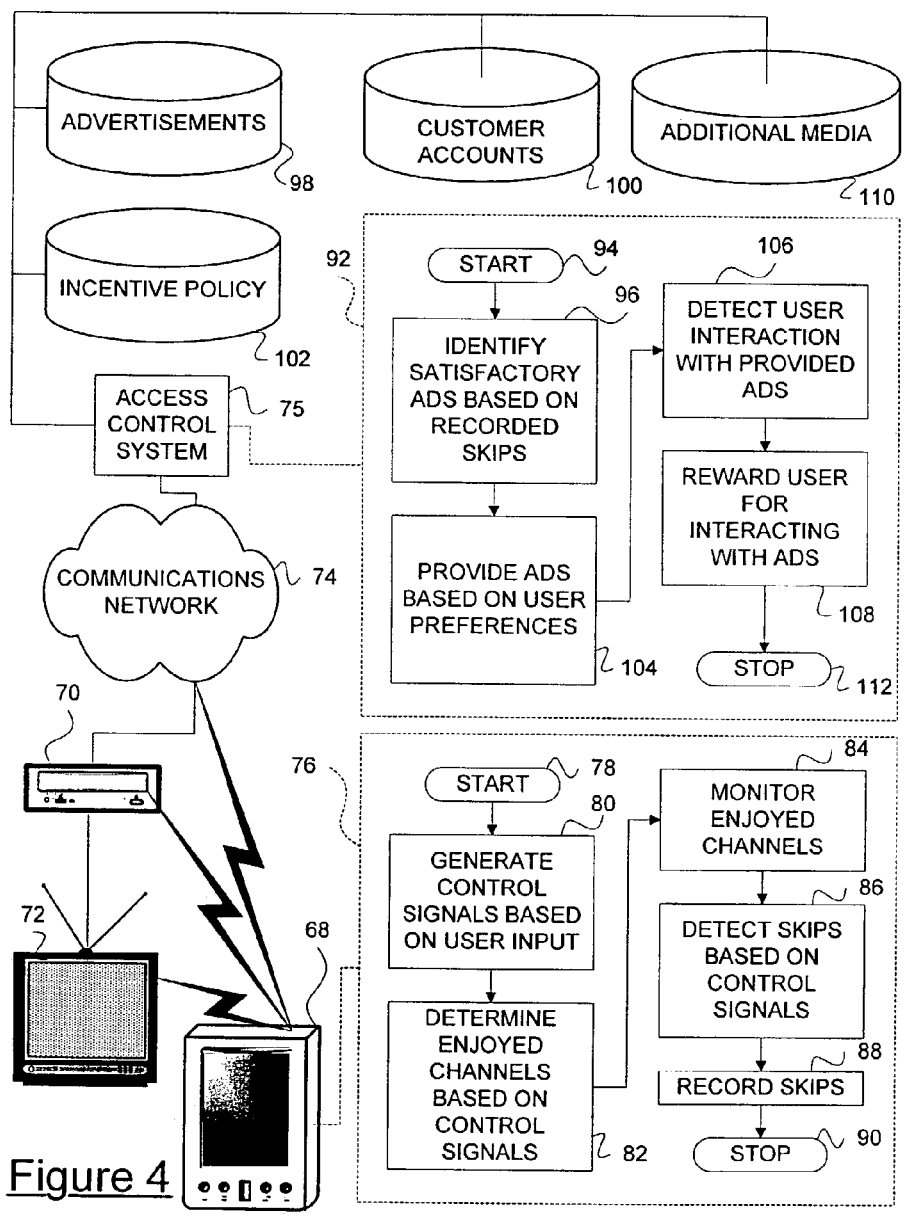
FIG. 4 is a block and flow diagram depicting a first alternative embodiment of the system and method of the present invention.

Some alternative embodiments according to the present invention are further explored below. FIG. 4, for example, illustrates an embodiment of the present invention wherein a remote control device 68 is adapted to affect control of local devices, such as recording device 70 and television 72, while communicating with an advertisement provider over communications network 74. Accordingly, the method of the present invention is divided among remote control device 68 and access control system 75 of the advertisement provider.

Method 76 of operation for remote control device 68 begins at 78 and proceeds to step 80, wherein device 68 generates control signals based on user input. Accordingly, device 68 is able to determine enjoyed channels of a television broadcast based on the control signals at step 82, and monitor the enjoyed channels at step 84 using, for example, one or more onboard tuners and decoders. Thus, device 68 can detect skips based on the control signals and the monitored channels at step 86 by detecting channel switching, recording, and/or fast forwarding through advertising content. As a result, device 68 can monitor and decode a channel that the user is watching while simultaneously monitoring and decoding a channel that the user is recording; the recorded advertisements can be deemed skipped, for example, while an advertisement on the watched channel can be deemed skipped if the user switches channels during the advertisement. Later, if the user watches the recorded programming and does not fast forward through an advertisement, it can be deemed unskipped. The advertisements and/or information identifying the skipped advertisements are recorded at step 88 by device 68. Information identifying a skipped advertisement can correspond to an identification of a particular program, an identification of a particular advertiser, and/or an identification of a particular product or service category. Method 76 ends at 90.

Method of operation 92 of access control system 75 begins at 94 and proceeds to step 96, wherein satisfactory advertisements are identified based on skips recorded by device 68 and communicated to system 75 over communications network 74. The satisfactory advertisements are identified, for example, based contents of advertisement database 98, user preferences inferred from a user profile of customer accounts database 100, and an advertisement trading scheme of incentive policy database 102. Accordingly, an advertisement for a masculine hygiene product may be identified as satisfactory for a male user skipping an advertisement for a feminine hygiene product, and the opposite further applies. Also accordingly, an advertisement for skiing equipment and/or a ski vacation can be identified for a user with an expressed interest in skiing. Advertisements are thus provided to users based on user preferences by delivering the identified advertisements to the remote control device 68 and/or television 72 at step 104.

Method 92 includes detecting user interaction with a provided advertisement at step 106, and rewarding the user for interacting with the provided advertisements at step 108. For example, a film advertisement delivered to television 72 can be accompanied by a question relating to the advertisement simultaneously or later delivered to device 68. A user response communicated to system 75 over communications network 74 can thus indicate user interaction with the advertisement. Also, rewards to the user can take the form of media content being provided to the user based on a maintained incentive policy. As a result, a user may access video on demand services, an EPG, and/or receive discounts on media subscription services. Alternatively or additionally, a user may receive discounts on products and/or services that may be related to an advertised product or service. Method 92 ends at 112.

Figure 5:
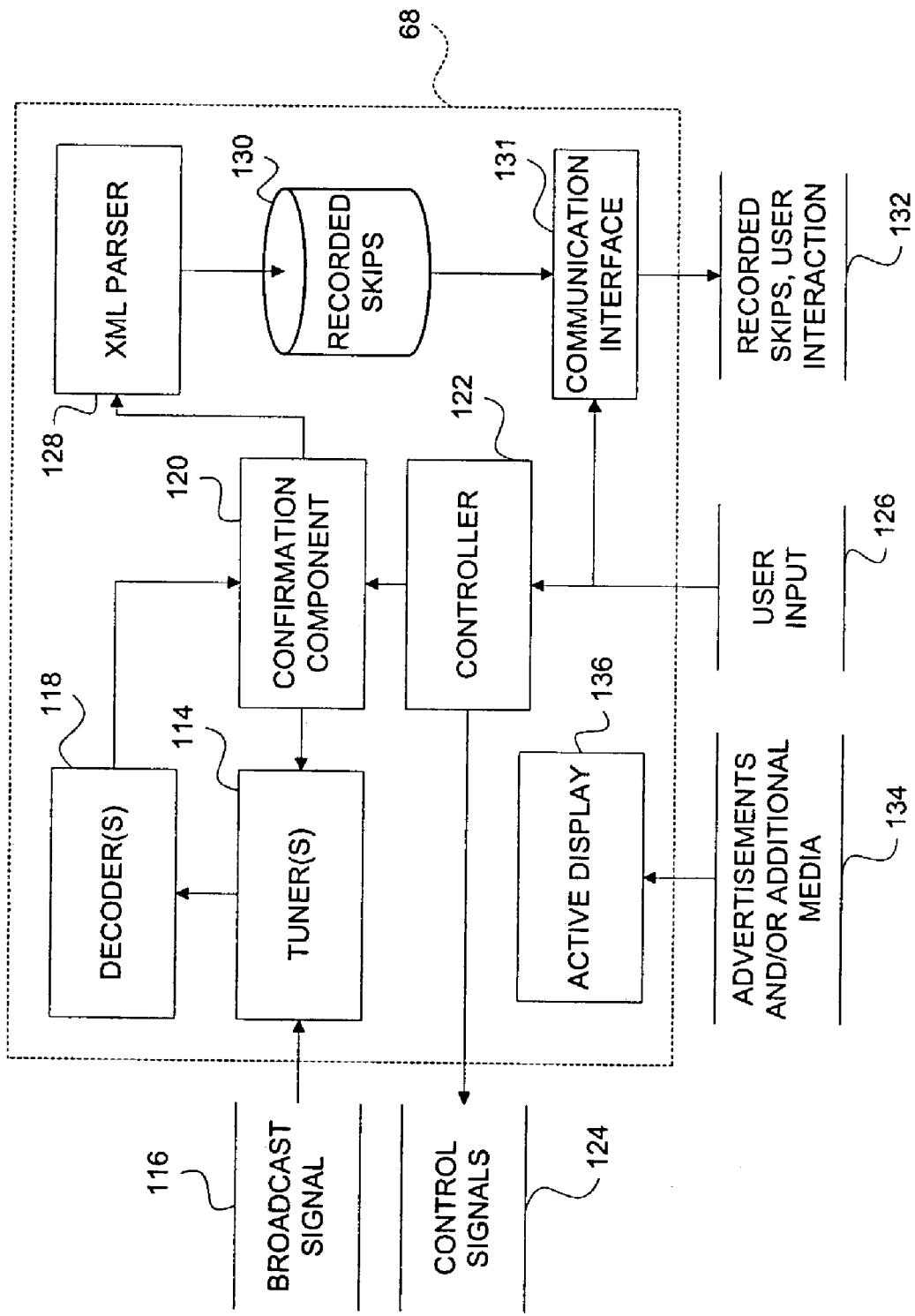
FIG. 5 is a block diagram depicting a remote control device according to the first alternative embodiment of the present invention.

Remote control device 68 is further illustrated in FIG. 5. Accordingly, device 68 has one or more tuners 114 for tuning to various selected channels of a received broadcast signal 116, and a plurality of decoders 118 for decoding at least the supplemental data (EPG, closed captions, coded advertisements, timing information, etc.) contained in signal 116. Confirmation component 120 can thus monitor the channels the user is enjoying, and operate tuners 114 based on signals from device controller 122, which generates control signals 124 based on user input 126. When an advertisement is deemed skipped by confirmation component 120, then XML parser 128 parses skipped advertisements, information about skipped advertisements, and/or information about a program the user enjoyed while skipping advertisements. XML parser 128 parses the supplemental data based on metadata, and/or adds metadata as needed. The parsed skips are recorded in data store 130, and output at 132 via communication interface 131 (wired or wireless) in response to user input 126. Advertisements received in response at 134 are rendered to active display 136. User input 126 corresponding to user interaction with a received advertisement is also output at 132 via communication interface 131. Additional media received as a reward at 134 is also rendered to active display 136.

Figure 6:
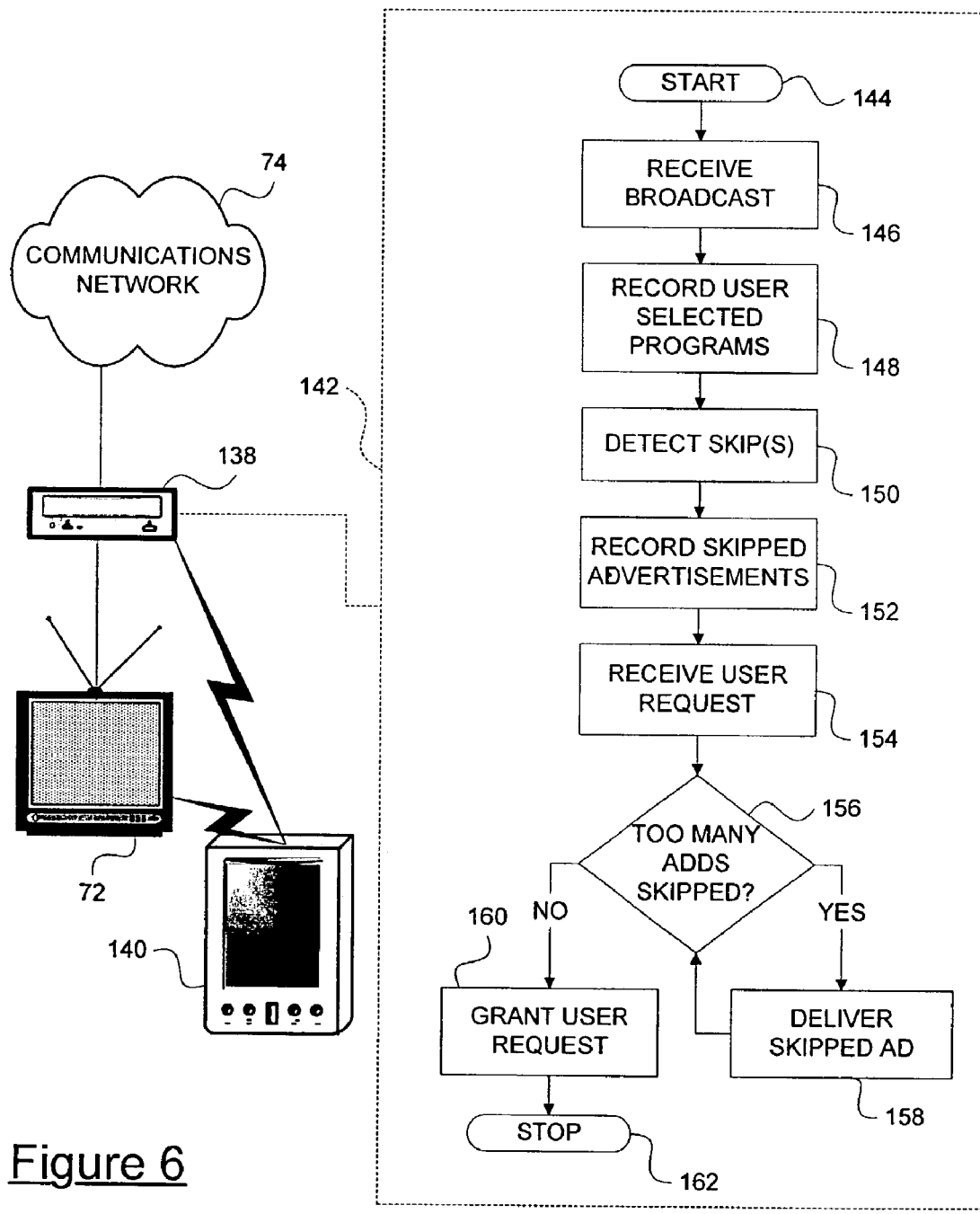
FIG. 6 is a block and flow diagram depicting a second alternative embodiment of the system and method of the present invention.

Another alternative embodiment is shown in FIG. 6. Therein, recording device 138 is receptive of a broadcast signal over communications network 74 and renders media content to an active display of television 72 in response to control signals received from remote control device 140. In this embodiment, recording device 138 is adapted to substantially perform the method of the present invention. Accordingly, method of operation 142 for recording device 138 begins at 144 and proceeds to step 146, wherein the broadcast is received. User selected programs are recorded at step 148 in an indexed fashion, and skips are detected at step 150 when the user plays back the recorded program but skips the advertisement. Detection of skips at 150 can alternatively or additionally correspond to deeming all advertisements associated with a recorded program skipped, deeming a recorded advertisement skipped if the user fast forwards through it during replay, or deeming an advertisement skipped at recording and unskipped during replay if the user does not fast forward through the advertisement. Skipped advertisements are recorded at step 152; if all advertisements are normally recorded, then step 152 can correspond to maintaining and/or updating an index of advertisements to indicate which of the recorded advertisements have been skipped.

When a user communicates a request to device 138, such as a request to browse available recordings, browse an EPG, set recording preferences, watch a recording, and/or fast forward through an advertisement portion of a recording, then device 138 determines whether too many advertisements have been skipped at 156. If so, then device 138 delivers a skipped advertisement to the user at step 158 by, for example, playing the recorded advertisement on television 72 or transmitting the recorded ads to remote control device 140 for rendering to its active display. Once the number of skipped advertisements has been reduced to an acceptable level at 156, device 138 grants the user request at step 160. The user request can correspond to a request for skipped advertisements, such that the user can build credit towards future uninterrupted viewing of media content. Also, the user may, in some circumstances, be able to view advertisements in a preferred category more than once, thus avoiding advertisements in a non-preferred category according to a built in advertisement trading scheme. Media content providers can offer reduced subscription rates to users utilizing such recording devices. The method 142 ends at 162.

Figure 7:
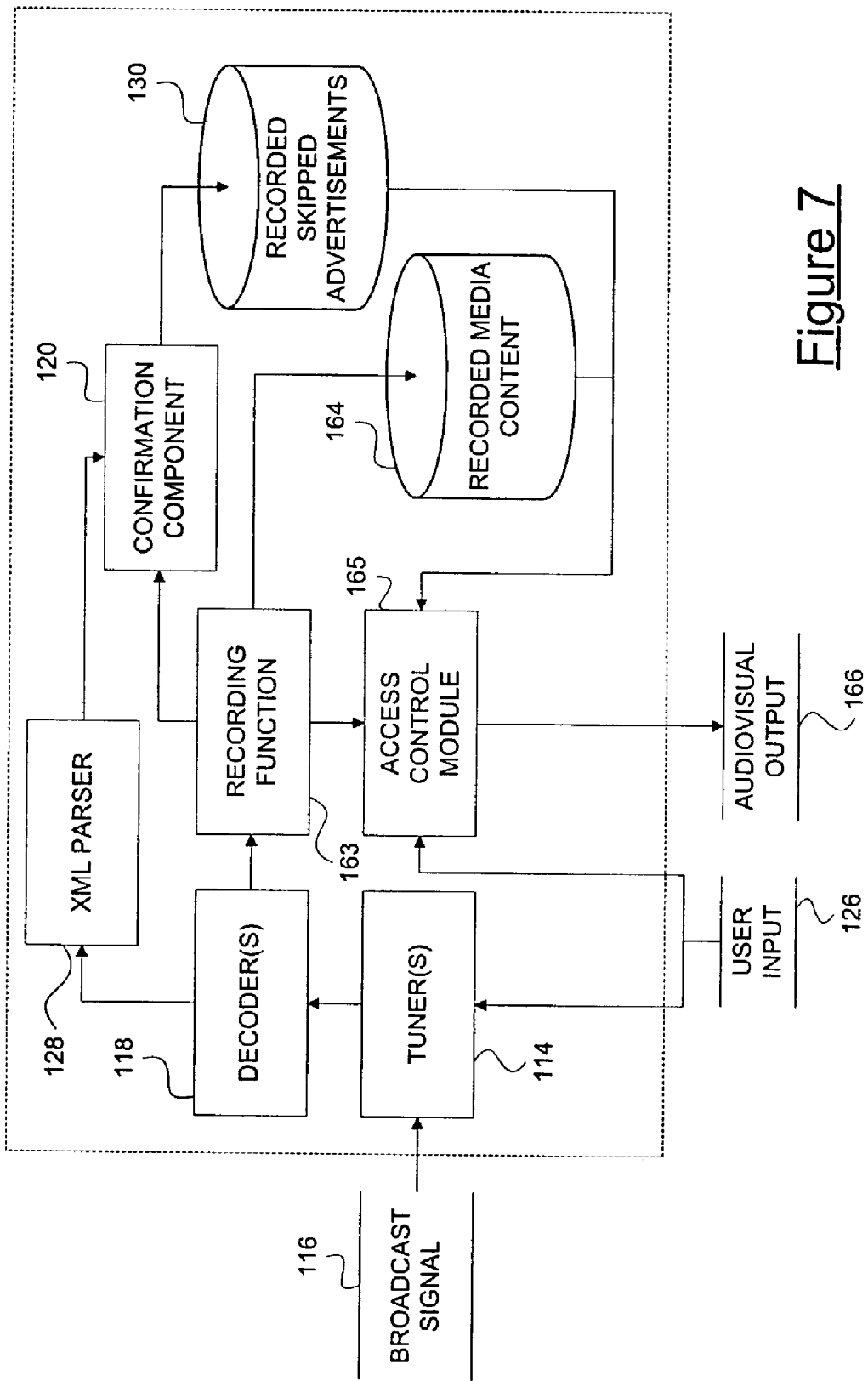
FIG. 7 is a block diagram depicting a recording device according to the second alternative embodiment of the present invention.

The recording device 138 is further illustrated in FIG. 7. Therein, one or more tuners 114 and decoders 118 tune in and decode channels of received broadcast signal 116 according to user input 126. Recording function 163 records decoded media content in data store 164 according to user input 126. Decoded supplemental data is parsed by XML parser 128, which adds metadata as needed, and confirmation component 120 detects advertisement skipping based on the parsed supplemental data and operation of recording function 163. Skipped advertisements are thus recorded in data store 130. EPG information, closed captions, unrecorded media, and recorded programs index are routed through recording function 163 and access control module 165 as audiovisual output 166 to an active display. Also, recorded media content and/or advertisements are routed through access control module 165 as output 166. Access control module 165 is adapted to maintain an advertisement viewing credit account for a user based on user skipping and viewing of advertisements, and to deliver various media to the user as output 166 so long as the user's advertisement viewing credit is good.

Figure 8:
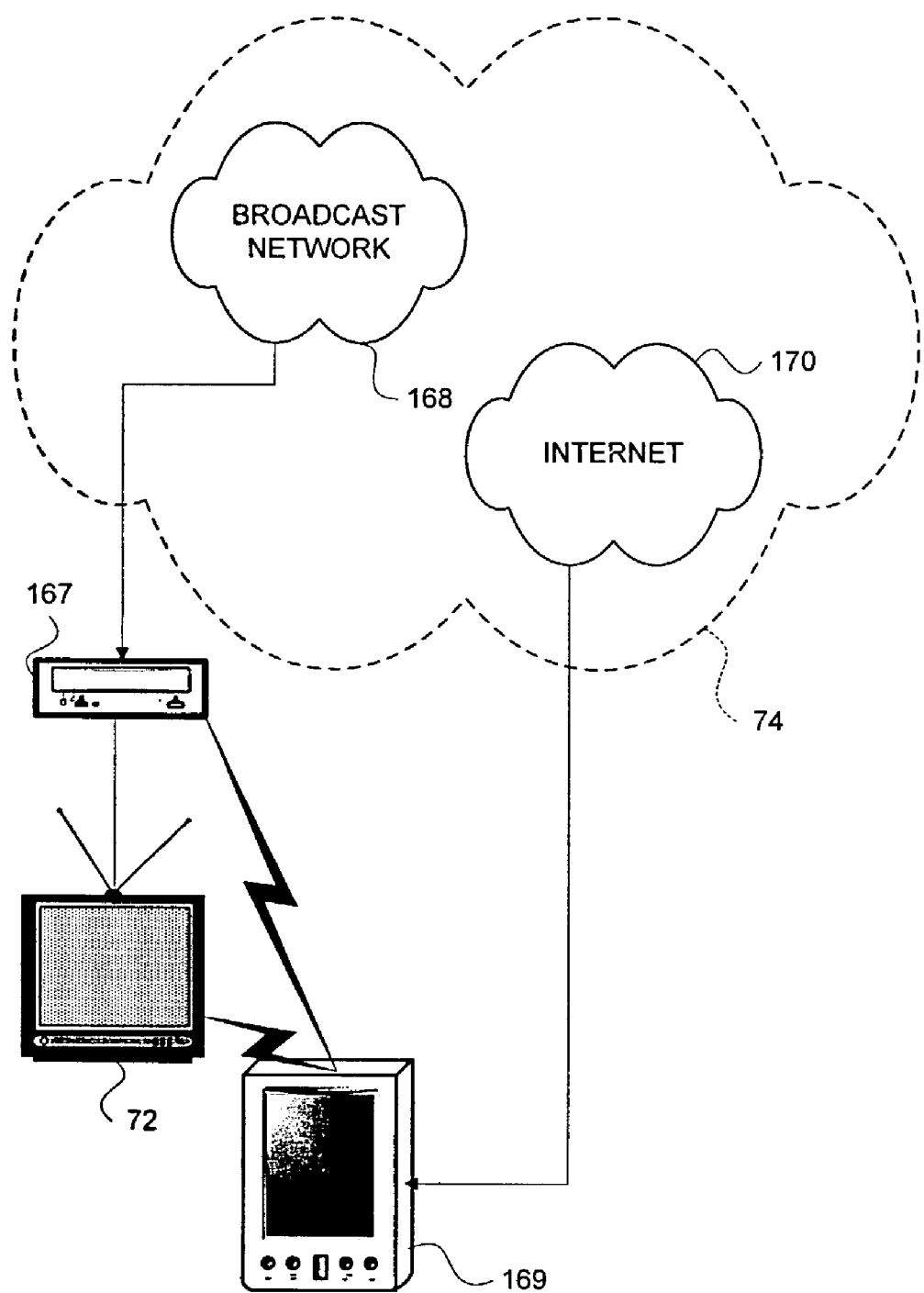
FIG. 8 is a block diagram depicting the preferred embodiment of the system of present invention.
Figure 9:
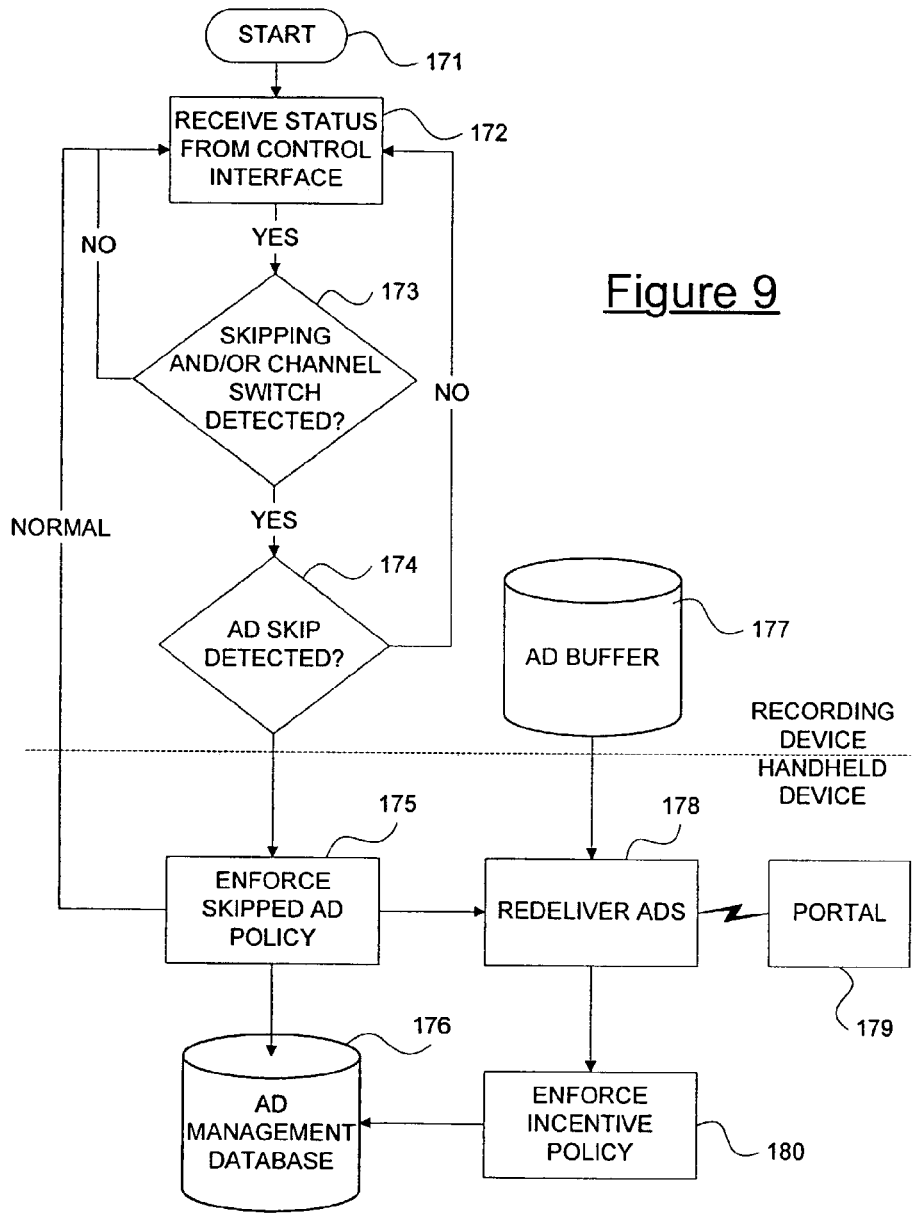
FIG. 9 is a flow diagram depicting the preferred embodiment of the method of the present invention.

A further alternative embodiment is explored with reference to FIG. 8. Therein, recording device 167 is adapted to receive a broadcast signal from broadcast network 168, and remote control device 169 is adapted to browse the Internet 170. Together, broadcast network 168 and the Internet 170 comprise communications network 74. Also, steps comprising the method of the present invention are distributed among recording device 167 and remote control device 169. Accordingly and with reference to FIG. 9, the method of the present invention begins at 171 and proceeds to step 172, wherein the user's viewing status is received via a control interface in the form of control signals. If channel switching and/or fast forwarding is detected at 173, and if an advertisement is being skipped as a result as at 174, then the detected advertisement skip is communicated to the remote control device, which enforces a skipped advertising policy at step 175. If action needs to be taken in accordance with the policy, and based on user advertisement viewing history and skipped advertisement attributes recorded in ad management database 176, then skipped advertisements stored on the recording device in ad buffer 177 are communicated to the handheld device and redelivered at step 178 directly to an active display on the remote control device and/or via an ad delivery portal 179, such as by email, voicemail, text, and/or webpage. The incentive policy is enforced at step 180 by adjusting data in database 176 in accordance with the policy.

Figure 10:
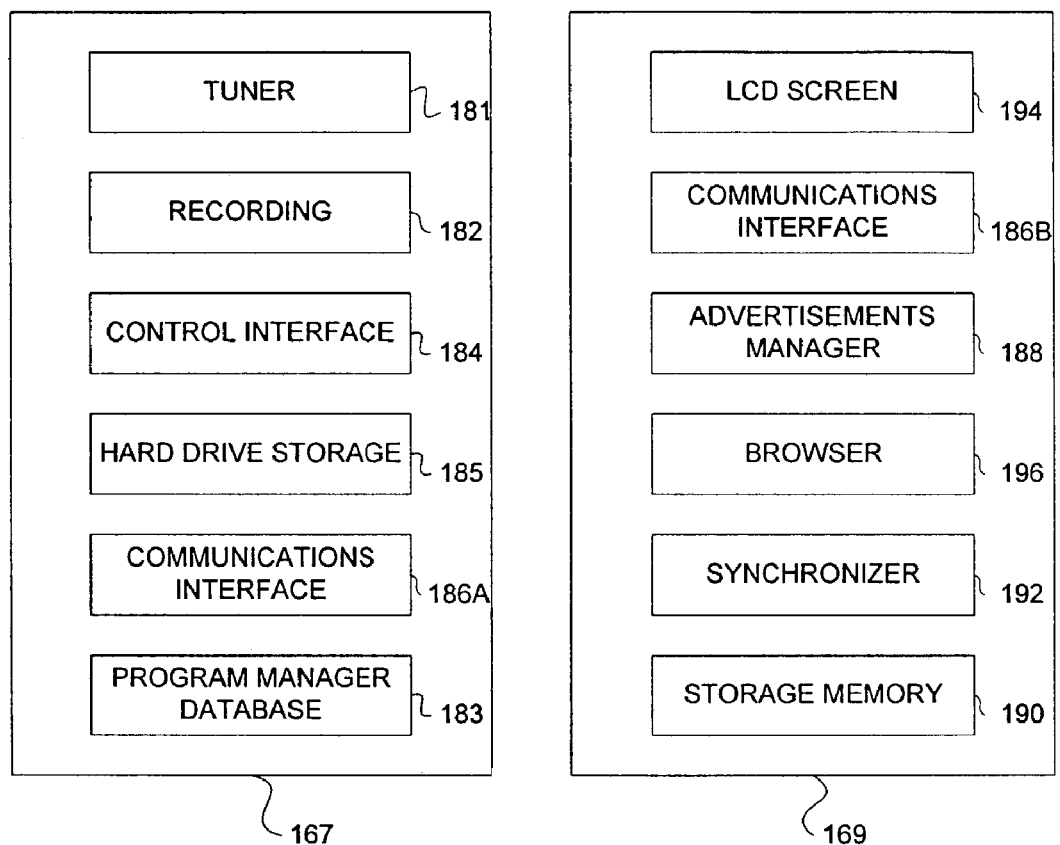
FIG. 10 is a block diagram depicting remote control and recording devices according to the preferred embodiment of the present invention.

With reference to FIG. 10, recording device 167 uses a tuner 181 to receive and decode the broadcast signal, and recording function 182 to store programs in program manager database 183 in response to control signals received from remote control device 169 via control interface 184. Skipped advertisements are stored in hard drive storage 185, and skipped advertisements and advertisement skip detection are communicated to remote control device 169 via communications interface 186A. Remote control device 169, in turn receives communications from recording device 167 via communications interface 186B. Remote control device 169 uses advertisements manager 188 to enforce the skipped advertisements policy and incentive policy, and storage memory 190 to maintain the advertisement management database. Synchronizer 192 redelivers received advertisements and additional media to liquid crystal display (LCD) screen 194. The user accesses the advertisements, the Internet, and/or additional media via browser 196.

Figure 11:
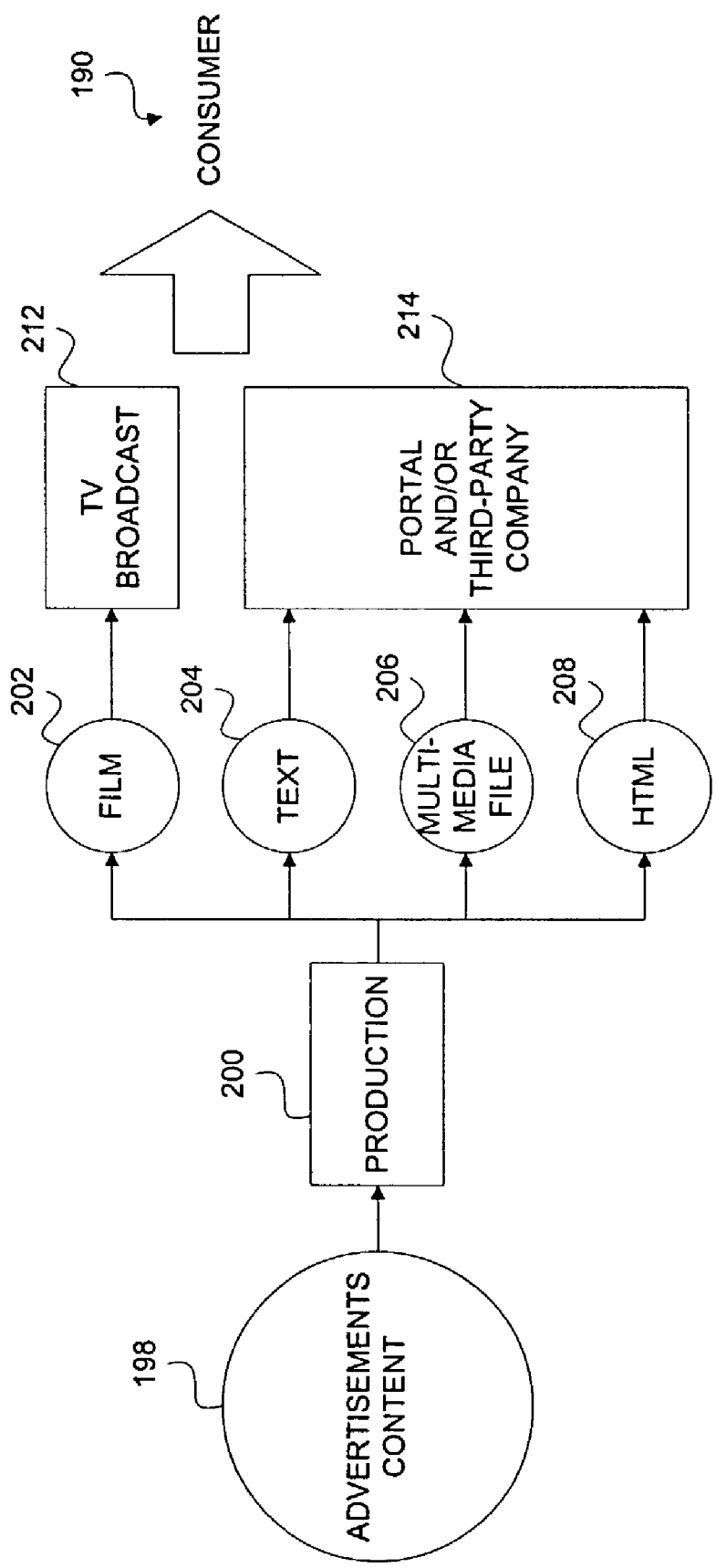
FIG. 11 is a block diagram depicting advertisement distribution in accordance with the preferred embodiment of the present invention.

Together, recording device 167 and remote control device 169 facilitate advertisement redelivery in a media content and advertisement delivery scheme in accordance with FIG. 11. Therein, advertisements and/or media content 198 are produced at 200 in various forms, including film 202, text 204, multimedia files 206, and/or web pages 208. In turn, these various forms are delivered to the consumer 210 from disparate sources, such as TV broadcast 212 and a portal and/or third party company 214. Accordingly, recording device 167 (FIG. 8) and television 72 affect delivery of film-based media, including advertisements, while remote control device 169 affects delivery of other, additional and/or corresponding forms of media, including advertisements.

Figure 12:
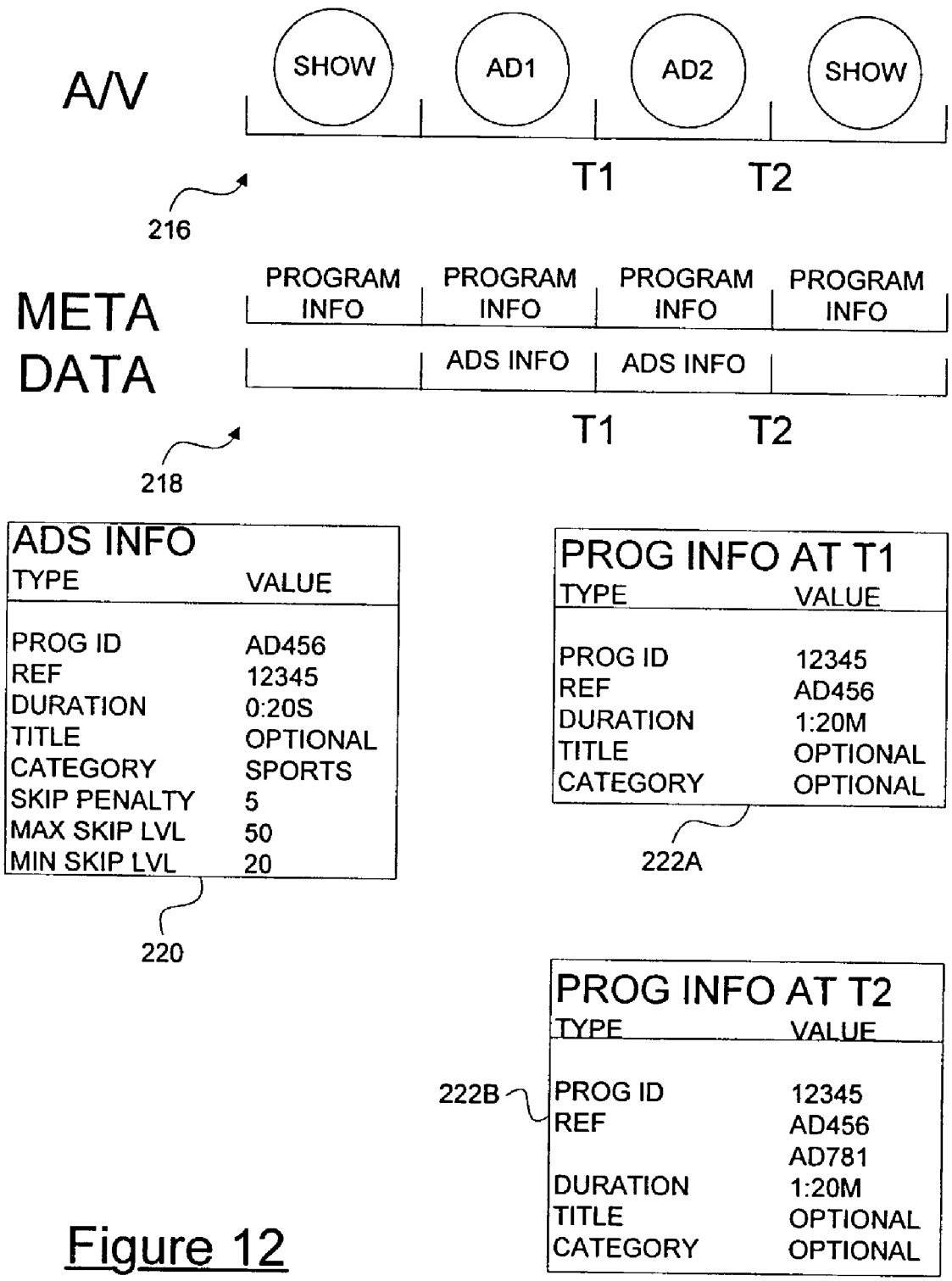
FIG. 12 is a block diagram depicting metadata in a broadcast stream according to the preferred embodiment of the present invention.

Media delivery is further facilitated by use of a broadcast signal that includes metadata describing various portions of transmitted media, including advertisements. As shown in FIG. 12, an audio visual portion 216 of the broadcast signal includes meta data separating different types of media content. The metadata 218 serves to describe adjacent and/or superimposed media content, including advertisements with respect to which it is embedded in the broadcast signal. Thus, layers of inter-related metadata 218 describe, for example, programs and/or associated advertisements at particular points in time of a broadcast signal. Advertisement related metadata 220, for example, describes a particular advertisement, the program with which it is associated, a duration of the advertisement, an optional title, a category, a skip penalty, and related thresholds termed max and min skip level. Also, program related metadata 222A at a particular point in time T1 describes a particular program, advertisements thus far associated with the program, a program duration, and optional title and category. Program related metadata 222B at a later point in time T2, for example, differs from metadata 222A in that an additional advertisement has been associated with the program.

Figure 13:
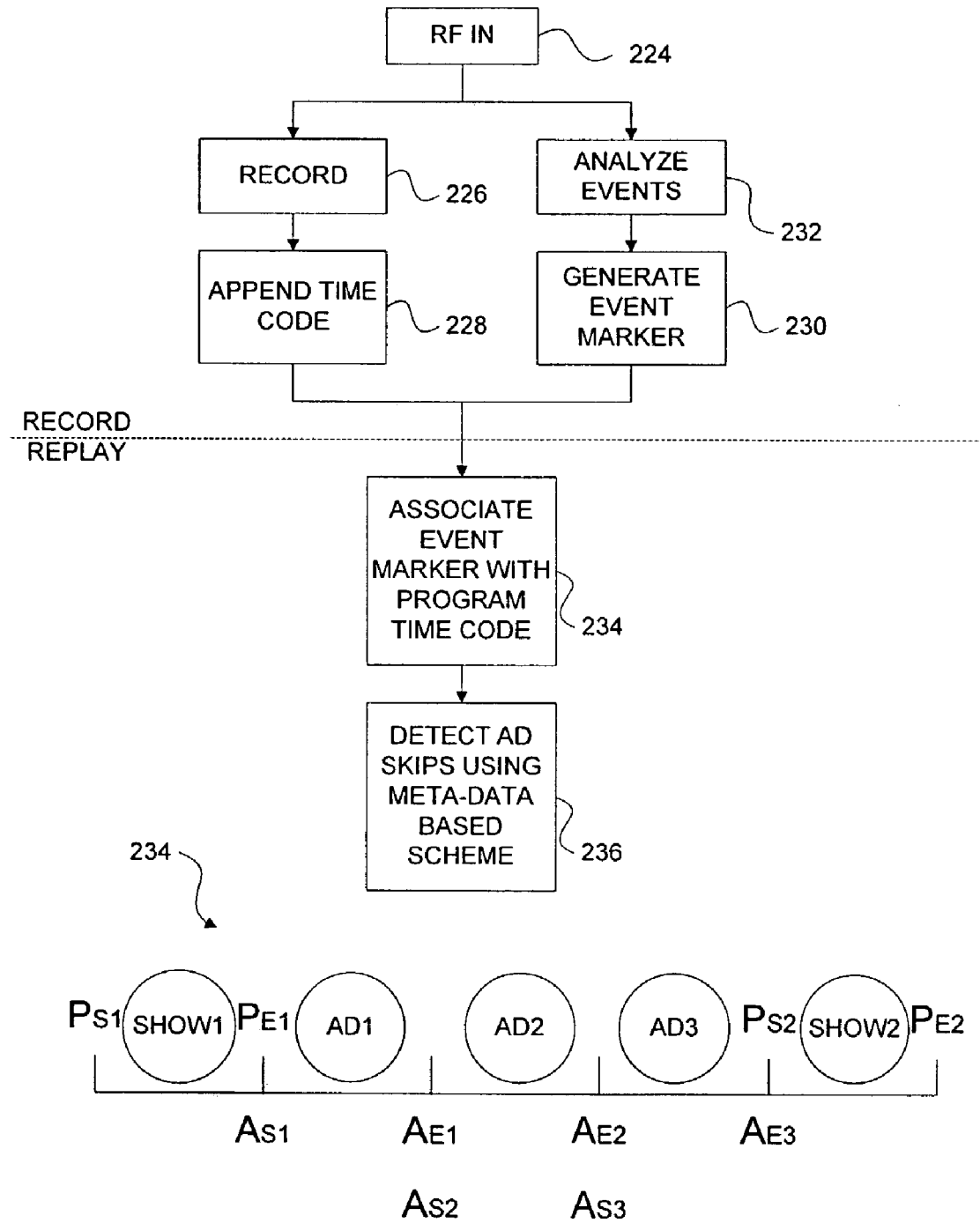
FIG. 13 is a block and flow diagram depicting metadata construction from a traditional broadcast stream according to the preferred embodiment of the present invention.

FIG. 13, however, demonstrates a method according to the present invention for constructing metadata from a conventional TV broadcast. For example, when the broadcast is received at 224 and recorded at 226 with appended time codes at 228 in the normal fashion, event markers are concurrently generated based on detection of blank frames at 230. Subsequent event analysis at 232 determines the type of events marked, and this information is used to identify event markers. This type of event marking is disclosed in U.S. Pat. No. 5,333,091, entitled Method and Apparatus for Controlling a Videotape Player to Automatically Scan Past Recorded Commercial Messages, issued to Iggulden, et al. and incorporated herein by reference. In accordance with the present invention, the information used to identify the event markers is added to the event markers, and the event markers are associated with the program time codes during replay at 234 to create metadata as at 236 that can be used to identify recorded advertisements for redelivery, and/or to retrieve corresponding web-based media over the Internet. The second option can, for example, be implemented with an advertising content provider having a database of information relating programs to nationally and locally distributed advertisements at particular times during the programs. Thence, an appropriate advertisement can be identified based on the IP address of the remote control device, the channel being recorded by the user, and the time stamp of the constructed metadata. The event analysis identifying the advertisement portion of the broadcast assists in detecting ad skipping according to a metadata-based scheme at 238.

Figure 14:
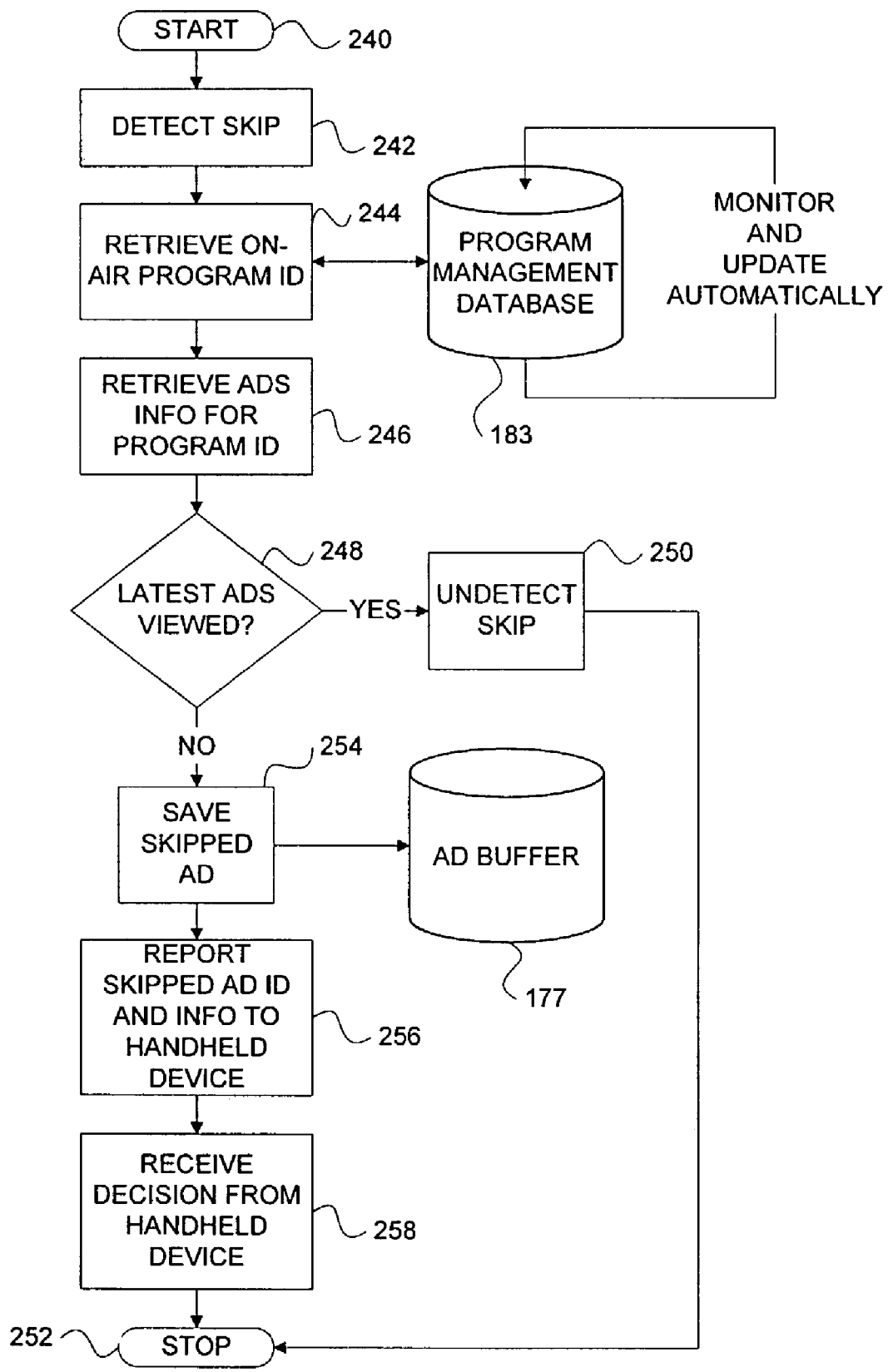
FIG. 14 is a flow diagram depicting a metadata-based scheme of advertisement skip detection according to the preferred embodiment of the present invention.

The method of detecting ad skipping according to a metadata-based scheme is shown in FIG. 14, and this method is performed by the recording device during replay in the preferred embodiment. Beginning at 240, the method includes detecting a skip of an advertisement during replay at step 242. Detection in this context corresponds to automatic or user induced fast forward or skip of an advertisement during replay. The on-air program identification for the advertisement is then retrieved at step 244 from the automatically monitored and updated program manager database 183. The metadata identifying the skipped advertisement is retrieved at step 246, and it is determined whether the skipped advertisement has already been viewed at 248. For example, if a recorded advertisement is viewed ahead of time, then the skip of the advertisement is undetected at step 250, and the method of operation terminates at 252. Otherwise, if the ad has not been viewed, then it is saved in ad buffer 177 at step 254, and the skipped advertisement metadata is communicated to the remote control device at step 256, which executes an advertisement redelivery method. A decision is then received from the remote control device at step 258, and the recording device responds accordingly. The method then ends at 252.

Figure 15:
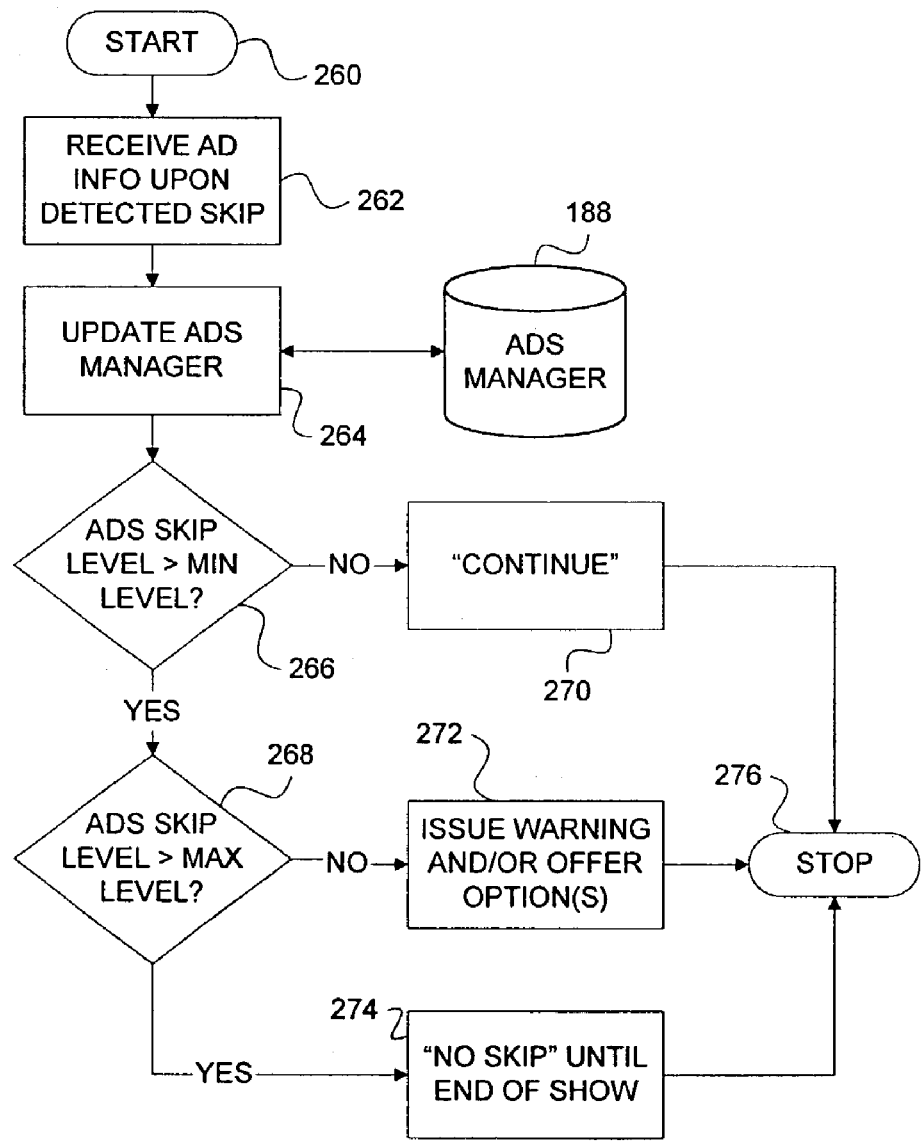
FIG. 15 is a flow diagram depicting advertisement redelivery in accordance with the preferred embodiment of the present invention.

The advertisement redelivery method executed by the remote control device is illustrated in FIG. 15. Beginning at 260, information identifying a skipped advertisement, such as metadata, is received at step 262 upon detection of the skip. The ad management database 176 of the advertisements manager is accordingly automatically updated at step 264 by adding the information or incrementing a reference count with respect to corresponding information already stored in database 176. Skip thresholds associated with the skipped advertisement are then compared at 266 and 268 to a points system index reflecting a current balance in a user's advertisement viewing related credit account; where metadata has been created for traditional audio/visual broadcast, the recording device can assign thresholds based, for example, on duration of the skipped advertisement.

If the user's advertisement viewing credit is sufficiently high to warrant allowing the user to skip the advertisement, at least temporarily, then the remote control issues a decision to continue the program at 270 and adjusts the user's credit index accordingly. If, however, the user's credit account is high enough to skip the advertisement, but close to being depleted, then various options are offered to the user at 272 relating to advertisement redelivery, and the exercised option is communicated as a decision to the recording device. For example, the user can choose to view the advertisement on the television in its original form, to retrieve a corresponding interactive media file, text message, and/or webpage over the Internet, and/or to have a corresponding advertisement delivered by voicemail and/or email. Further, if the user's credit account is depleted, then a decision is issued to the recording device at step 274 not to allow any further advertisement skipping until the end of the current program. A user can, in some circumstances, pause the current program and clear the "no skip" command by viewing several ads and building up the credit account balance. The method ends at 276.

The description of the invention is merely exemplary in nature and, thus, variations that do not depart from the gist of the invention are intended to be within the scope of the invention. In particular, the form and implementation of the advertisement redelivery system and method of the present invention can vary according to particular business systems with which they are implemented, available technology, and prevailing market forces at a particular point in time. For example, the system and method of the present invention can be implemented in a cable company's set top box by controlling signal descrambling based on the user's ad viewing credit account, and partially or fully subsidizing the user's subscription and/or video on demand access as a reward. Also, the present invention can be implemented with a video on demand service fully implemented over the Internet, wherein users are required to view and/or interact with advertisements and/or fill out surveys to subsidize receipt of a desired video stream. Further, the present invention can be implemented with a television having time shift recording capability. Still further variations, including combinations and/or alternative implementations, of the embodiments described herein can be readily obtained by one skilled in the art without burdensome and/or undue experimentation. Such variations are not to be regarded as a departure from the spirit and scope of the invention.

What is claimed is:

1. An advertising content redelivery system for use with real-time broadcasting and time shift recording, comprising:
    a confirmation component detecting skipping of advertising content by a user;
    an input receptive of user preferences relating to redelivery of skipped advertising content;
    a redelivery module redelivering skipped advertising content to the user in accordance with the user preferences; and
    a user incentive sub-system rewarding the user based on user interaction with skipped advertising content by delivering additional media content corresponding to an electronic programming guide providing information relating to available media content.

2. The system of claim 1, comprising a redelivery verification module verifying redelivery of skipped advertising content by detecting user interaction with skipped advertising content.

3. The system of claim 2, wherein said redelivery verification module includes an interaction detector detecting user manipulation of skipped advertising content on an active display.

4. The system of claim 1, wherein said user incentive subsystem includes a media interface delivering additional media content to the user contingent upon user interaction with skipped advertising content.

5. The system of claim 4, wherein said media interface is adapted to deliver additional media content and skipped advertising content via a first active display, thereby avoiding intrusion upon delivery of primary media content via a second active display.

6. The system of claim 4, wherein said user incentive sub-system includes a points accumulation sub-system permitting a user to accumulate points based on user interaction with skipped advertising content, and said media interface is adapted to apply accumulated points to delivery of additional media content.

7. The system of claim 1, comprising a data store storing skipped advertising content.

8. The system of claim 7, wherein said confirmation component is adapted to deliver advertising content to said data store upon detecting skipping of the advertising content by the user.

9. The system of claim 1, wherein said redelivery module is adapted to redeliver skipped advertising content by email to the user in accordance with user preferences.

10. The system of claim 1, wherein said redelivery module is adapted to redeliver skipped advertising content by voicemail to the user in accordance with user preferences.

11. The system of claim 1, wherein said redelivery module is adapted to redeliver skipped advertising content by communicating the skipped advertising content from a recording device to a remote control device having an active display and adapted to deliver the advertising content via the active display.

12. The system of claim 1, comprising a metadata parser adapted to generate metadata by adding identifying information to event markers and associating the event markers with corresponding time codes, and adapted to associate the metadata with corresponding portions of advertising content.

13. An advertising content redelivery method for use with real-time broadcasting and time shift recording, comprising:
    detecting skipping of advertising content by a user;
    storing skipped advertising content;
    redelivering skipped advertising content to the user in a non-intrusive manner that does not interfere with user enjoyment of primary media content and
    rewarding the user based on user interaction with skipped advertising content, where the rewarding includes granting the user access to an electronic programming guide providing information relating to available media content.

14. The method of claim 13, comprising detecting user interaction with skipped advertising content, thereby verifying redelivery of skipped advertising content.

15. The method of claim 14, wherein said detecting user interaction with skipped advertising content includes detecting user manipulation of skipped advertising content on an active display.

16. The method of claim 13, wherein said rewarding includes delivering additional media content to the user contingent upon user interaction with skipped advertising content.

17. The method of claim 16, wherein said rewarding includes delivering additional media content and skipped advertising content via a first active display, thereby avoiding intrusion upon delivery of primary media content via a second active display.

18. The system of claim 16, wherein said rewarding includes:
    permitting a user to accumulate points based on user interaction with skipped advertising content; and applying accumulated points to delivery of additional media content.

19. The system of claim 13, comprising:
receiving user preferences relating to redelivery of skipped advertising content; and
redelivering skipped advertising content to the user in accordance with the user preferences.

20. The system of claim 13, wherein said redelivering skipped advertising content includes redelivering skipped advertising content by email to the user.

21. The method of claim 13, wherein said redelivering skipped advertising content includes redelivering skipped advertising content by voicemail to the user.

22. The method of claim 13, wherein said redelivering skipped advertising content includes transferring the skipped advertising content from a recording device to a remote control device having an active display and redelivering the skipped advertising content via the active display.

23. The method of claim 13, comprising:
adding identifying information to event markers;
associating the event markers with corresponding time codes to generate metadata;
associating the metadata with corresponding portions of advertising content decoded from a broadcast signal,
wherein said detecting skipping of advertising content by a user includes identifying a skipped advertisement during replay of corresponding primary media content based on the metadata.

24. An advertising content redelivery system for use with real-time broadcasting and time shift recording, comprising:
a confirmation component detecting skipping of advertising content by a user;
an input receptive of user preferences relating to redelivery of skipped advertising content;
a redelivery module redelivering skipped advertising content to the user in accordance with the user preferences;
wherein said redelivery module is adapted to redeliver skipped advertising content by communicating the skipped advertising content from a recording device to a handheld device having an active display and adapted to deliver the advertising content via the active display; and
wherein said handheld device integrates with said confirmation component in said detect skipping of advertising content.

* * * * *